Figure 1:
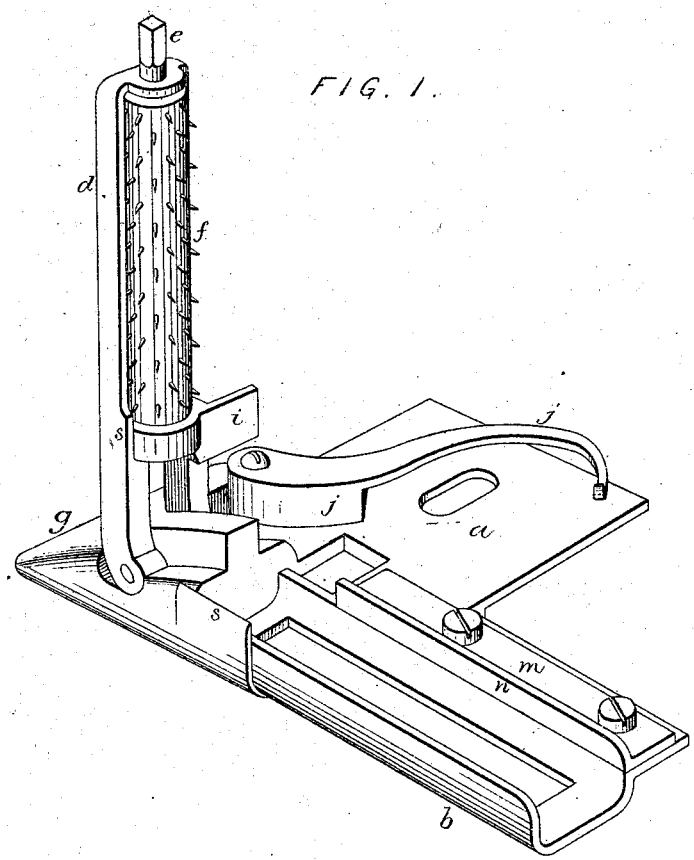

(No Model.)   2 Sheets—Sheet 1.

J. B. STAMOUR.
Loom Temple.

No. 237,333.   Patented Feb. 1, 1881.

WITNESSES

INVENTOR
John B. Stamour
by his Attorneys
Howson and Son

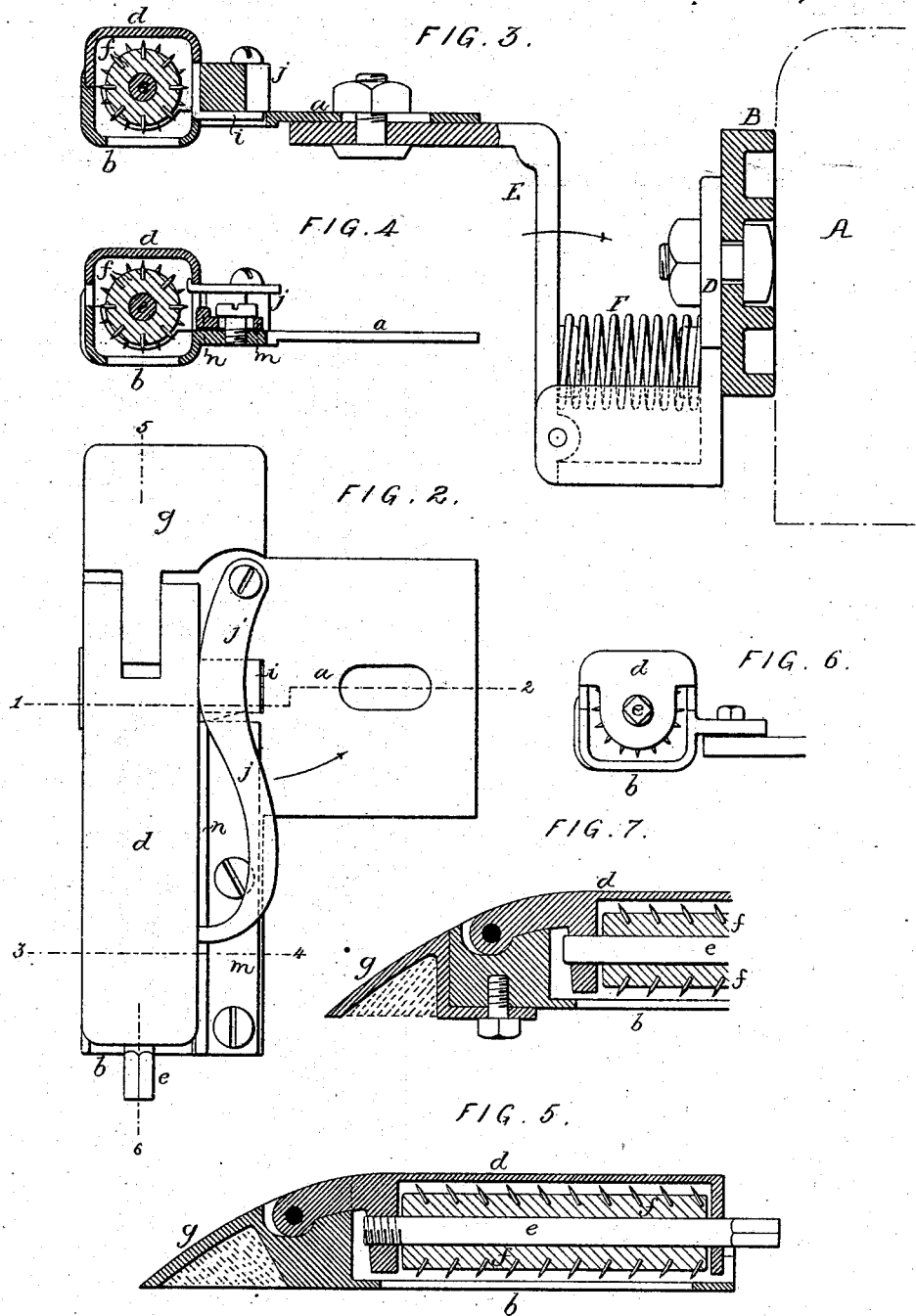

United States Patent Office.

JOHN B. STAMOUR, OF PHILADELPHIA, PENNSYLVANIA, ASSIGNOR OF ONE-HALF TO THOMAS CUNNINGHAM, HORATIO B. LINCOLN, FRANK P. PENDLETON, LUCIAN BROWN, GEORGE BROWN, AND HERMAN E. CUNNINGHAM, OF SAME PLACE.

LOOM-TEMPLE.

SPECIFICATION forming part of Letters Patent No. 237,333, dated February 1, 1881.

Application filed May 28, 1880. (No model.)

*To all whom it may concern:*

Be it known that I, JOHN B. STAMOUR, a subject of the Queen of Great Britain and Ireland, residing in Philadelphia, Pennsylvania, have invented certain Improvements in Loom-Temples, of which the following is a specification.

The objects of my invention are to facilitate the changing of the shuttles and to provide simple means for retaining and releasing the roller-carrier. These objects I attain in a manner too fully described hereinafter to need preliminary explanation.

In the accompanying drawings, Figure 1, Sheet 1, is an isometric perspective view of part of my improved temple, showing the roller-carrier elevated; Fig. 2, Sheet 2, a plan view of that part of the temple shown in Fig. 1, with the roller-carrier depressed; Fig. 3, a view showing the temple and the plate whereby said temple is supported on the breast-beam, part of the temple being in section on the line 1 2, Fig. 2, and the supporting-plate being in section; Fig. 4, a section on the line 3 4, Fig. 2; Fig. 5, a section on the line 5 6, Fig. 2; and Figs. 6 and 7, views of modifications.

A represents part of the breast-beam, to the inner side of which is secured, in any suitable manner, a plate, B, the latter carrying a bracket, D, to a projection on which is pivoted a bent arm, E, acted on by a spring, F, which tends to maintain the arm in the position shown in Fig. 3, the arm being at liberty to yield, however, in the direction of the arrow. To the horizontal portion of the arm E is bolted a plate, $a$, which projects from and forms part of the shield or trough $b$ of the temple. To a lug at one end of the trough is pivoted the roller-carrier $d$, the latter consisting of a cap or cover, with a bearing at each end for the spindle $e$ of the roller $f$, so that the trough $b$ and carrier $d$ form the roller-box. On the outer end of the trough $b$—that is to say, on the end adjacent to the shuttle-box—is formed a curved deflector, $g$, as shown in Fig. 5, the upper edge of the pivot end of the roller-carrier $d$, and of the lug to which the same is hung, being also curved, so as to form a continuation of said deflector. The roller-box of the temple thus presents an inclined or tapered outer end—a feature of great importance, as it permits the rapid changing of the shuttles when the lay is at the limit of its forward movement, the attendant with one hand operating the picker so as to project the empty shuttle from the shuttle-box, while with the other hand he introduces a filled shuttle into said box. The empty shuttle, as it is projected from the box, strikes the deflector $g$, and is thrown over the roller-box and onto the web of cloth, whereas if said roller-box had a blunt outer end, as usual, this expeditious plan of removing the empty shuttle could not be adopted, and a longer time would be required to change the shuttles.

I am aware that the inner end of the roller-box of a temple—that is to say, the end which projects over the cloth—has been provided with an inclined deflector for preventing injury to the temple when the shuttle accidentally leaves the shuttle-race during the working of the loom; but it will be evident that a deflector on the inner end of the roller-box will not facilitate the changing of the shuttles in the manner above set forth.

The roller-carrier $d$ has a lug, $i$, which, when the said carrier is depressed, is adapted to a slot in the plate $a$, and is retained therein by an arm, $j$, pivoted to said plate $a$, and having its outer end bent under the edge of the cap of the roller-carrier, the arm having a slight inherent spring, and having its end hooked, so that it is retained in the position shown in Fig. 2 so securely as to prevent accidental displacement, but can by a slight effort be released from the control of the cap of the roller-carrier and turned back in the direction of the arrow, thereby releasing the lug $i$ when it is desired to elevate the roller-carrier.

To the plate $a$ is secured a plate, $m$, having on the edge adjacent to the roller $f$ a rib, $n$, the plate being slotted for the passage of the confining-bolts, so that it can be adjusted from and toward the roller, and secured in position after adjustment. By this means the space between the toothed roller and the ribbed edge of the plate $m$ may be varied to accord with the varying thickness of the cloth which is being woven.

The extent to which the cloth embraces the roller is varied by the vertical adjustment of the plate $m$, such adjustment being effected by the insertion of filling-pieces of greater or less thickness between the plates $m$ and $a$.

The shield $b$ and plate $m$ may, if desired, be made in one piece, as shown in Fig. 6, vertical adjustment being provided for in order to vary the extent to which the cloth embraces the roller. The preferable plan, however, is to make the plate $m$ independent of the shield, as shown in Figs. 2 and 4.

The shield $b$ and roller-carrier $d$ have projections $s$, which, when the roller-carrier is depressed, slightly overlap each other, and form a guard for preventing the outer edge of the cloth from approaching the extreme outer end of the roller. The loose ends of the filling-threads, in the absence of such a guard, have a tendency to overlap the end of the roller and bind between the same and the bearing for the pivot-pin, and thereby prevent the free rotation of the roller. The projections may simply meet each other instead of overlapping, provided the joint is a close one; or, instead of forming projections on both the roller-carrier and shield, a projection of the proper height may be formed upon but one of said parts. The construction shown, however, is preferred.

In Fig. 7 I have shown a modification of my invention, in which the deflector $g$ is detachably secured to the roller-trough $b$ instead of being made in one piece therewith—a construction which is demanded in some cases. The curve or inclination of the deflector will be governed by the circumstances under which the temple is to be used, it being advisable to make the inclination as gradual as possible without unduly increasing the height of the roller-box or the extent to which the deflector projects beyond the end of the same. For this reason it is preferable to incline the end of the roller-carrier $d$ adjacent to the deflector, as shown in Figs. 5 and 7.

A solid block, as indicated by dotted lines in Figs. 5 and 7, may be used in place of the deflector, (shown by full lines,) if desired, and various ways of constructing and attaching the deflector to the temple may be adopted, the particular construction of the temple itself, in most cases, governing these features.

Although I have shown in the drawings and described in the specification certain devices for hanging the temple to the breast-beam, it should be understood that these devices form no part of my present invention, nor is my invention limited thereto, as the temple may be constructed with an arm adapted to a box in the top of the beam and acted on by a spring; or any of the other well-known ways of hanging the temple may be adopted.

I claim as my invention—

1. A loom-temple having a deflector, $g$, at the outer end of the roller-box, whereby the changing of shuttles is facilitated, as set forth.

2. The combination of the roller-trough, the pivoted roller-carrier, and a deflector, formed partly by an inclined projection on the roller-trough and partly by the inclined top of the roller-carrier, as specified.

3. The combination of the plate $a$, the hinged roller-carrier $d$, having a lug, $i$, and the pivoted arm $j$, adapted to retain the lug $i$, and to be retained by the cap of the roller-carrier, as set forth.

In testimony whereof I have signed my name to this specification in the presence of two subscribing witnesses.

JOHN B. STAMOUR.

Witnesses:
JAMES F. TOBIN,
HARRY SMITH.